(12) United States Patent
Fukudome et al.

(10) Patent No.: US 7,749,932 B2
(45) Date of Patent: Jul. 6, 2010

(54) COMPOSITION, SINTERED PRODUCT OF SILICON NITRIDE, ARTICLE OF MANUFACTURE, AND CUTTING METHOD

(75) Inventors: Takero Fukudome, Kagoshima (JP);
Shuichi Tateno, Kagoshima (JP);
Hiroshi Yoshimitsu, Kagoshima (JP);
Takashi Watanabe, Kagoshima (JP);
Tatsuyuki Nakaoka, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 289 days.

(21) Appl. No.: 12/071,502

(22) Filed: Feb. 21, 2008

(65) Prior Publication Data
US 2008/0220243 A1 Sep. 11, 2008

(30) Foreign Application Priority Data
Feb. 23, 2007 (JP) ............................. 2007-043816
Nov. 28, 2007 (JP) ............................. 2007-307349
Dec. 25, 2007 (JP) ............................. 2007-331734

(51) Int. Cl.
*C04B 35/587* (2006.01)
(52) U.S. Cl. ...................... 501/97.2; 501/97.3; 501/97.4
(58) Field of Classification Search ................ 501/97.2, 501/97.3, 97.4
See application file for complete search history.

(56) References Cited

U.S. PATENT DOCUMENTS

| 4,280,973 | A | * | 7/1981 | Moskowitz et al. | ......... 264/668 |
| 5,173,458 | A | * | 12/1992 | Nishioka et al. | ........... 501/97.3 |
| 5,382,273 | A | | 1/1995 | Mehrotra et al. | |
| 5,384,081 | A | * | 1/1995 | Wotting et al. | .............. 264/676 |
| 5,525,134 | A | | 6/1996 | Mehrotra et al. | |
| 5,922,629 | A | * | 7/1999 | Park et al. | ................... 501/97.2 |
| 6,001,759 | A | * | 12/1999 | Miyanaga et al. | ........... 501/97.2 |

FOREIGN PATENT DOCUMENTS

| JP | 57051174 | * | 3/1982 |
| JP | 09-142935 | | 6/1997 |

* cited by examiner

*Primary Examiner*—Karl E Group
(74) *Attorney, Agent, or Firm*—Birch, Stewart, Kolasch & Birch, LLP (57) ABSTRACT

A sintered product of silicon nitride includes a crystal phase mainly having silicon nitride crystal grains and an amorphous grain-boundary phase located on the grain boundaries of the silicon nitride crystal grains. The grain-boundary phase contains lanthanum, aluminum, magnesium, silicon, and oxygen. The sintered product described above contains 0.1% by mass or more of lanthanum on an oxide basis, 0.05 to 0.6% by mass of aluminum on an oxide basis, 0.3% by mass or more of magnesium on an oxide basis, and 2.5% by mass or less of oxygen. The total amount of lanthanum on an oxide basis, aluminum on an oxide basis, and magnesium on an oxide basis is 3.5% by mass or less.

18 Claims, 2 Drawing Sheets

COMPOSITION, SINTERED PRODUCT OF SILICON NITRIDE, ARTICLE OF MANUFACTURE, AND CUTTING METHOD

CROSS-REFERENCE TO RELATED APPLICATIONS

The present application claims priority under 35 U.S.C. §119 to Japanese Patent Application No. 2007-43816, 2007-307349 and 2007-331734, filed Feb. 23, 2007, Nov. 28, 2007, Dec. 25, 2007, respectively entitled. The contents of these applications are incorporated herein by reference in their entirety.

BACKGROUND OF THE INVENTION

1. Field of the Invention

The present invention relates to a silicon nitride composition and a sintered product of silicon nitride having improved wear resistance and chipping resistance. The present invention also relates to articles of manufacture such as, but not limited to, a cutting tool and also to a cutting method.

2. Description of the Related Art

Silicon nitride and SIALON known as engineering ceramics have high heat resistance, thermal shock resistance, and oxidation resistance as well as high strength, high strength at high temperatures, and high toughness. Thus, progress has been made in the application of silicon nitride and SIALON to hot engine components, such as automobile engine parts, gas turbines and turbocharger rotors, and cutting tools. See, for example, U.S. Pat. Nos. 4,295,791 and 4,323,394, hereby incorporated by reference.

For example, sintered products of silicon nitride containing yttrium as a rare-earth element distributed in grain boundaries between silicon nitride grains are used for such purposes.

In cutting tools among such components, a force of a strong impact may be applied thereto. Thus, materials having improved impact resistance and chipping resistance have been required.

Although attempts have been made to improve mechanical and thermal properties of a sintered product of silicon nitride, still more improvement is necessary.

For example, proposed are a sintered product of silicon nitride including an amorphous grain-boundary phase containing a rare-earth element, silicon, aluminum, and traces of magnesium, which are used as metal components, and oxygen and nitrogen. These components in the grain boundary phase are controlled to a specific composition range.

DESCRIPTION OF THE INVENTION

According to a first aspect of the present invention, a sintered product of silicon nitride includes a crystal phase and an amorphous phase. The crystal phase is composed mainly of silicon nitride crystal grains. The amorphous phase is located in the grain boundaries of the silicon nitride crystal grains, hence it is a "grain-boundary phase". The grain-boundary phase contains lanthanum, aluminum, magnesium, silicon, and oxygen. The sintered product described above contains 0.1% by mass or more of lanthanum on an oxide basis, 0.05 to 0.6% by mass of aluminum on an oxide basis, 0.3% by mass or more of magnesium on an oxide basis, and 2.5% by mass or less of oxygen. The total amount of lanthanum on an oxide basis, aluminum on an oxide basis, and magnesium on an oxide basis is 3.5% by mass or less.

According to a second aspect of the present invention, a cutting tool is composed of the sintered product of silicon nitride described above.

According to a third aspect of the present invention, a cutting method includes cutting a workpiece with the cutting tool described above. The ways in which a cutting tool of the invention are used are well-known to one of ordinary skill in the art.

The cutting method according to the third aspect of the invention includes cutting the workpiece with the cutting tool of the invention, having improved wear resistance and improved chipping resistance, thereby improving the dimensional accuracy of the cut workpiece. Furthermore, cutting can be performed for a long time without replacement of the cutting tool.

According to a fourth aspect of the present invention, a sintered product of silicon nitride includes a crystal phase mainly having silicon nitride crystal grains and an amorphous grain-boundary phase located on the grain boundaries of the silicon nitride crystal grains. The grain-boundary phase contains lanthanum, aluminum, magnesium, silicon, and oxygen. The magnesium content in a plane at a depth of 0.3 mm below the surface of the sintered product of silicon nitride is 1.3% by mass or less on an oxide basis. The magnesium content in the plane at a depth of 0.3 mm below the surface of the sintered product is less than the magnesium content in a plane at a depth of 1 mm below the surface of the sintered product. The difference in magnesium content between the plane at a depth of 0.3 mm and the plane at a depth of 1 mm below the surface of the sintered product is 0.5% by mass or less on an oxide basis. The total amount of lanthanum on an oxide basis, aluminum on an oxide basis, and magnesium on an oxide basis is 3.5% by mass or less.

A sintered product of silicon nitride according to an embodiment has a microstructure with silicon nitride crystals as main crystals and a grain-boundary phase. Silicon nitride mainly has a $\beta$-silicon nitride crystal phase. The $\beta$-silicon nitride crystal phase may form a solid solution, $\beta$-SIALON, with a small amount of aluminum oxide. Grains of at least one compound selected from nitrides, carbides, and carbonitrides of Ti, Hf, Zr, and the like, and silicates of W, Mo, and the like may also be present in the composition in addition to grains of silicon nitride in some cases. In these instances, these grains are present in 0.1 to 2.0% by mass of the total composition of the sintered product. The sintered product contains silicon nitride in an amount of preferably 94.5% by mass or more and more preferably 96.5% by mass or more. In this case, excellent properties of silicon nitride can be sufficiently exhibited.

Overall Composition

According to this embodiment, the grain-boundary phase contains lanthanum, aluminum, magnesium, silicon, and oxygen. The grain-boundary phase contains 0.1% by mass or more of lanthanum on an oxide basis ($La_2O_3$), 0.05% to 0.6% by mass of aluminum on an oxide basis ($Al_2O_3$), 0.3% by mass or more of magnesium on an oxide basis (MgO), and 2.5% by mass or less of oxygen, with respect to the entire sintered product, wherein the total amount of lanthanum on an oxide basis, aluminum on an oxide basis, and magnesium on an oxide basis is 3.5% by mass or less.

In respect to lanthanum, the total amount on an oxide basis is 3.15% by mass or less. In respect to magnesium, the total amount on an oxide basis is 3.35% by mass or less. The total amount of lanthanum, aluminum and magnesium is 0.45% or more. The amount of oxygen is 0.2% by mass or more. The amount of silicon nitride is 99.55% by mass or less.

The lanthanum content is particularly preferably 1% by mass or more on an oxide basis in order to densify the sintered product and form needle-like silicon nitride crystal grains. The aluminum content is particularly preferably 0.2% by mass or more on an oxide basis in order to reduce a temperature at which a liquid phase of the sintering additives is formed and to densify the sintered product. To suppress a reduction in wear resistance due to a reduction in oxidation resistance of the sintered product, the aluminum content is preferably in the range of 0.2% to 0.55% by mass and more preferably 0.3% to 0.5% by mass. The magnesium content is preferably 0.35% by mass or more and more preferably 0.4% by mass or more on an oxide basis in order to reduce a temperature at which a liquid phase of the sintering additives is formed and to densify the sintered product.

The oxygen content of the sintered product of silicon nitride is preferably 2.5% by mass or less, more preferably 2.2% by mass or less, and still more preferably 2% by mass or less in order to maintain a reduction in temperature at which a liquid phase of the sintering additives is formed and the densification of the sintered product and make a sintered product of silicon nitride having improved oxidation resistance and wear resistance.

Such a composition makes it possible to densify the sintered product of silicon nitride even in the case of small amounts of the sintering additives. Among oxides of the group 3 elements, the eutectic temperature of lanthanum oxide ($La_2O_3$) and silica ($SiO_2$) is lower than the eutectic temperature of an oxide of another group 3 element (e.g., erbium or yttrium) and silica. Specifically, the eutectic temperature of erbium oxide ($Er_2O_3$) and silica is 1,680° C., and the eutectic temperature of yttrium oxide ($Y_2O_3$) and silica 1,660° C. In contrast, the eutectic temperature of lanthanum oxide and silica is 1,625° C. That is, the eutectic temperature of lanthanum oxide and silica is low. Silica is contained in materials of silicon nitride.

The incorporation of magnesium oxide and aluminum oxide into the combination of lanthanum oxide and silica having a low eutectic temperature reduces a liquid-phase-formation temperature to 1,400° C. Thus, the densification of silicon nitride starts at a low temperature, achieving a fine microstructure. Furthermore, the abnormal grain growth of silicon nitride crystal grains can be inhibited, resulting in a sintered product of silicon nitride having wear resistance and chipping resistance.

Use of lanthanum, silicon, aluminum, and magnesia as sintering additives according to the invention provides good control of growth of silicon nitride grains and allows the average length of the silicon nitride crystal grains (of the six longest silicon nitride crystal grains in a field of view of 0.015 $mm^2$) to be 10 µm or less, thereby improving chipping resistance in addition to improving wear resistance.

The incorporation of a rare-earth element other than lanthanum (i.e. the omission of lanthanum) only results in a sintered product having poor chipping resistance.

However, lanthanum may contain other rare-earth elements, such as Ce, Pr, and Nd, as impurities in a total amount of 1% by mass or less on an oxide basis. In other words, the sintered product may contain rare-earth elements other than lanthanum, such as Ce, Pr, and Nd, in a total amount of 0.03% by mass or less on an oxide basis. Even when the sintered product contains rare-earth elements, as impurities, other than lanthanum in a total amount of about 0.03% by mass on an oxide basis, the combination of lanthanum, silicon, aluminum, and magnesia provides sufficient improvement in properties.

The composition of the present invention is preferably free of yttrium, or at least contains yttrium only as an impurity, i.e. in an amount no more than 0.03% on an oxide basis. The composition may contain yttrium in an amount up to 0.15% on an oxide basis.

With respect to needle-like silicon nitride crystal grains, the number of crystal grains each having a length of 10 µm or more is preferably six or less in a field of view of 0.15 $mm^2$. This is because a reduction in the number of abnormally grown crystal grains results in a reduced tendency to cause chipping due to stress concentration on large grains during processing such as milling, which applies impacts to a cutting tool during processing, with a cutting tool composed of the sintered product of silicon nitride. The number of the crystal grains each having a length of 10 µm or more is more preferably five or less and still more preferably two or less in a field of view of 0.15 $mm^2$.

To reduce the number of abnormally grown crystal grains in the sintered product of silicon nitride, the sintering temperature is preferably minimized.

The incorporation of 0.1% to 2% by mass of silicide grains of an element in group 6 of the periodic table into the sintered product of silicon nitride of this embodiment suppresses a decrease in high-temperature strength and further improves the wear resistance of the sintered product of silicon nitride. The silicide grains of an element in group 6 of the periodic table are dispersed in the grain-boundary phase of the sintered product of silicon nitride.

Examples of silicide of an element in group 6 of the periodic table include chromium silicide, molybdenum silicide, and tungsten silicide. Tungsten silicide is preferably used because a fine powdery oxide material can be used to form fine grains during sintering.

The sintered product of silicon nitride of this embodiment preferably has a relative density of 99% or more. A relative density of 99% or more results in substantially no void in the sintered product, thereby further improving wear resistance. The sintered product with substantially no void results in a reduced tendency to cause chipping due to stress concentration on voids during processing such as milling, which applies impacts to a workpiece during processing. Hence, the sintered product has further improved chipping resistance.

The sintered product of silicon nitride of this embodiment can be densified to have a relative density of 99% or more by sintering under atmospheric pressure. Alternatively, for example, when sintering under pressure is performed, it is possible to suppress the abnormal grain growth of the crystal grains and increase the relative density.

Microstructure

Figure 1:
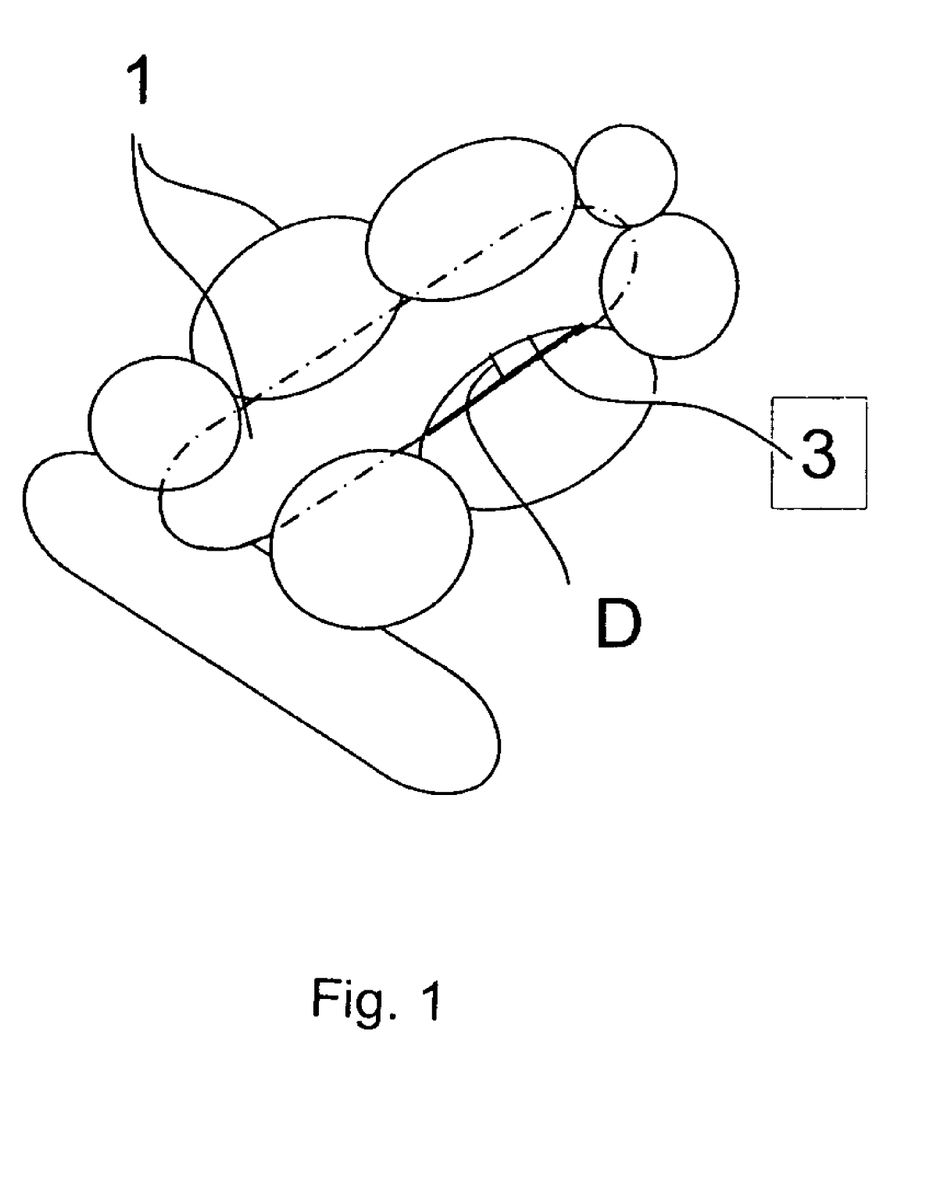
FIG. 1 is a schematic view of a sintered product of silicon nitride.

According to this embodiment, as shown in FIG. 1, preferably, silicon nitride crystal grains 1 are needle-like, the needle-like silicon nitride crystal grains 1 intersect and are in contact with each other, and one of the silicon nitride crystal grains 1 may have a depression 3 with a depth D of 50 nm or more, up to one-half the thickness of the crystal grain, but typically up to 500 nm, at the side thereof. The depression 3 has a shape corresponding to the shape of the side of the other silicon nitride crystal grain 1. The depression 3 is in contact with the side of the other silicon nitride crystal grains 1. In this embodiment, the other silicon nitride crystal grain 1 in contact with the depression 3 may have a depression at the side thereof.

In such a microstructure, the depression 3 having a depth of 50 nm or more at the side of the one of the silicon nitride crystal grains 1 contains the other silicon nitride crystal grains 1. In other words, the side of the other silicon nitride crystal grain 1 is partially embedded in the side of the one of the silicon nitride crystal grains 1, thereby increasing bonding strength between the silicon nitride crystal grains 1, increasing strength, and further improving wear resistance and chipping resistance.

The fact that the depression 3 having a depth of 50 nm or more at the side of the one of the silicon nitride crystal grains 1 contains the other silicon nitride crystal grains 1 significantly deflects the propagation direction of a crack that propagates along the interface between the grains 1. In other words, the propagation direction of the crack is changed by the presence of the depression 3 to preclude the crack propagation, thus improving strength and fracture toughness and providing the sintered product of silicon nitride having improved wear resistance and chipping resistance.

The proportion of the area of the needle-like silicon nitride crystal grains 1 having the depression 3 with a depth of 50 nm or more is preferably 30% or more in a 50-$\mu m^2$ area of any cross section of the sintered product. In this case, the microstructure has high bonding strength between the grains, and the propagation direction of a crack that propagates along the interface between the grains is significantly deflected, thereby improving strength and fracture toughness and providing the sintered product of silicon nitride having improved wear resistance and chipping resistance. The proportion of the area of the needle-like silicon nitride crystal grains 1 having the depression 3 with a depth of 50 nm or more is particularly preferably 50% or more in the 50-$\mu m^2$ area.

In a 50-$\mu m^2$ area of any cross section of the sintered product, when the silicon nitride crystal grains are regarded as spherical, preferably, the silicon nitride crystal grains have an average grain size of 0.5 µm or less and an average aspect ratio of 5 or less. The silicon nitride crystal grains preferably have an average grain size of 0.3 µm or less. In this case, the sintered product has a fine microstructure and proper needle-like silicon nitride crystal grains and thus has further improved wear resistance and chipping resistance.

The average grain size is determined as follows: An area occupied by the silicon nitride crystal grains in a scanning electron microscope (SEM) photomicrograph is measured, and a mean value is calculated. Assuming that the silicon nitride crystal grains are spherical and that the spherical silicon nitride crystal grains each have the maximum area of the cross section thereof in the plane of the SEM photomicrograph, the mean value is converted into a corresponding diameter to determine the average grain size. The area occupied by the silicon nitride crystal grains can be measured with, for example, image processing software (ImagePro Plus, manufactured by Nippon Roper Co., Ltd).

In this embodiment, use of lanthanum facilitates formation of the depression 3 having a depth of 50 nm or more at the side of one of the needle-like silicon nitride crystal grains 1. The side of a corresponding one of the silicon nitride crystal grains 1 is in contact with the depression 3. In this embodiment, the concept of the "contact" includes the case where grain boundaries are provided among the silicon nitride crystal grains. The depth of the depression 3 refers to a distance between the deepest point in the depression 3 and a straight line drawn across the depression 3 as shown in FIG. 1 in any cross section of the sintered product in a TEM photomicrograph.

A mechanism which forms the depression 3 at the side of the silicon nitride crystal grain is not clear. The inventors speculate on the following mechanism: use of a combination of lanthanum, silicon, aluminum, and magnesium initiates densification at a low temperature owing to a low formation temperature of a liquid phase. Thus, spaces for growth of silicon nitride grains are small at high temperatures at which grain growth occurs. The grain growth occurs while the silicon nitride grains are in contact. As a result, the depression having a depth of 50 nm or more at the side of one of the silicon nitride grains is formed so as to have a shape corresponding to the shape of the side of the other silicon nitride grain. Therefore, the irregular side face is formed.

In a sintered product of silicon nitride according to another embodiment, preferably, the magnesium content in a plane (hereinafter, also referred to as a "surface layer") at a depth of 0.3 mm below the surface of the sintered product is 1.3% by mass or less on an oxide basis, the magnesium content in the plane at a depth of 0.3 mm below the surface of the sintered product is less than the magnesium content in a plane (hereinafter, also referred to as an "inside") at a depth of 1 mm below the surface of the sintered product, and the difference in magnesium content between the plane at a depth of 0.3 mm and the plane at a depth of 1 mm below the surface of the sintered product is 0.5% by mass or less on an oxide basis.

In this structure, the components in the grain-boundary phase are uniformly present in the depth direction of the sintered product compared with the related art. This results in a reduced tendency to cause the difference in properties between the surface layer and the inside of the sintered product, thus improving wear resistance and chipping resistance.

The difference in magnesium content between the surface layer and the inside is preferably 0.4% by mass on an oxide (MgO) basis. The difference is desirably minimized, and is more preferably 0.1% by mass on an oxide basis.

It is known that evaporation of MgO is significant at an as-sintered surface. The above-described structure results in a small difference in magnesium concentration on an oxide basis between the as-sintered surface and the inside. The term "as-sintered surface" refers to a surface that is not subjected to processing such as grinding after sintering.

The total amount of lanthanum on an oxide basis, aluminum on an oxide basis, and magnesium on an oxide basis is 3.5% by mass or less.

In this embodiment, the magnesium content at the surface layer is 1.3% by mass or less on an oxide basis, thus reducing the number of voids at the surface layer to improve cutting performance. The magnesium content at the surface layer is preferably 0.3% to 0.8% by mass on an oxide basis.

Preferably, the sintered product of silicon nitride according to this embodiment has a relative density of 99% or more, the proportion of the area of the grain-boundary phase in the plane at a depth of 0.3 mm below the surface of the sintered product is 10% or less, and the proportion of the area of the grain-boundary phase in the plane at a depth of 1 mm below the surface of the sintered product is 10% or less. The area of the grain-boundary phase at 0.3 mm depth is most usually less than or equal to the area of the grain-boundary phase at 1 mm depth. Preferably the area of the grain-boundary phase at 3 mm below the surface is equal to the area of the grain-boundary phase at 1 mm below the surface. The difference in grain-boundary phase area from 0.3 mm depth to 0.1 mm depth can range from 0 to 3% and is preferably from 0 to 2%. The proportions of the areas of the grain-boundary phases in the planes at depths of 0.3 mm and 1 mm below the surface of the sintered product can be determined by mirror-finishing the planes at depths of 0.3 mm and 1 mm below the surface of the sintered product, immersing the mirror-finished surfaces in a solution containing 23% by mass hydrofluoric acid and 77% by mass water in a vessel, heating the vessel in a water bath having a temperature of 50° C. for 3 hours to etch the grain-boundary phases, analyzing the resulting etched planes by image analysis, and determining the proportions of void areas in a predetermined area of photomicrographs.

The proportion of the area of the grain-boundary phase in the plane at a depth of 0.3 mm below the surface of the sintered product is 10% or less, and the proportion of the area of the grain-boundary phase in the plane at a depth of 1 mm below the surface of the sintered product is 10% or less. In this case, the proportion of the grain-boundary phase in the sintered product is low, and variations in composition in the grain-boundary phase are also low, thereby improving chipping resistance.

The combination of lanthanum, silicon, aluminum, and magnesium significantly reduces the temperature at which the liquid phase of the grain-boundary phase is formed. This results in low-temperature sintering, thus suppressing the abnormal grain growth of silicon nitride crystal grains in the longitudinal direction and achieving a fine microstructure. Therefore, the sintered product of silicon nitride has improved wear resistance and chipping resistance.

Production Method

A method for producing a sintered product of silicon nitride according to an embodiment will be described below. For example, a silicon nitride powder, lanthanum hydroxide (La(OH)$_3$), aluminum oxide (Al$_2$O$_3$), and magnesium hydroxide (Mg(OH)$_2$) are prepared as starting materials. As needed, silicon dioxide (SiO$_2$) and a powder of a silicide of an element in group 6 of the periodic table are prepared.

As a material of silicon nitride, a α-silicon nitride powder, a β-silicon nitride powder, or a mixture thereof may be used. The particle sizes thereof are preferably 1 μm or less and particularly preferably 0.5 μm or less. The particle size of the silicon nitride crystals is at least 10 nanometers.

As a material of lanthanum, a lanthanum oxide powder may be used. However, lanthanum oxide has high hygroscopicity. Thus, a compound, such as lanthanum hydroxide, having low hygroscopicity and being formed into lanthanum oxide in the sintering step is preferably used. The lanthanum material contains 1% by mass or less of other rare-earth elements as impurities.

As a material of magnesium, magnesium oxide and magnesium carbonate may be used. However, magnesium oxide has high hygroscopicity, and magnesium carbonate generates a carbon dioxide gas. Thus, a compound, such as magnesium hydroxide, having low hygroscopicity and being formed into magnesium oxide in the sintering step without the generation of a carbon dioxide gas is preferably used.

As a material of silicon, silicon in the material of silicon nitride is used. Assuming that oxygen contained in the silicon nitride powder is present in the form of silicon oxide, the composition is adjusted. In the case of a lack of the material of silicon, a silicon dioxide powder is compounded.

As a material of aluminum, an aluminum oxide powder is used.

As the silicide of an element in group 6 of the periodic table incorporated into the sintered product of silicon nitride, tungsten silicide is preferably used. As a material powder of tungsten silicide, an oxide, carbide, silicide, or nitride of tungsten may be used. Tungsten oxide is preferably used because a fine powder is easily obtained at low price. Even when a material except silicide is used, the tungsten compound can be easily converted into tungsten silicide in the composition region of the sintered product of silicon nitride according to this embodiment. Alternatively, chromium or molybdenum may be used in place of tungsten.

These materials are weighed and mixed and ground with a known grinding device such as a ball mill. After a binder and a solvent are appropriately added to the mixture, the resulting mixed powder is granulated by spray drying or the like.

The granulated powder prepared by granulating the mixed powder having a predetermined composition is formed into an intended shape by a known forming method, such as metallic mold pressing, casting, extrusion molding, injection molding, or cold isostatic pressing. The resulting formed article is sintered at 1,650° C. to 1,850° C. by a known sintering method, such as sintering in a nitrogen atmosphere under atmospheric pressure, gas-pressure sintering, or hot pressing and then cooled to afford the sintered product of silicon nitride according to this embodiment.

To make the sintered product satisfying the requirements: the magnesium content in the plane at a depth of 0.3 mm below the surface of the sintered product is 1.3% by mass or less on an oxide basis, the magnesium content at the surface layer is less than the magnesium content at the inside, and the difference in magnesium content between the plane at a depth of 0.3 mm and the plane at a depth of 1 mm below the surface of the sintered product is 0.5% by mass or less on an oxide (MgO) basis, the resulting formed article is sintered at 1,325° C. to 1,375° C. for a predetermined period of time and then at 1,650° C. to 1,850° C. by a known sintering method, such as sintering in a nitrogen atmosphere under atmospheric pressure, gas-pressure sintering, or hot pressing, and cooled to afford the sintered product of silicon nitride according to this embodiment.

It is not clear why the difference in magnesium content between the plane at a depth of 0.3 mm and the plane at a depth of 1 mm below the surface of the sintered product should be 0.5% by mass or less on an oxide (MgO) basis. The inventors speculate on the following mechanism: Among oxides of the group 3 elements, the eutectic temperature of lanthanum oxide and silica is lower than the eutectic temperature of an oxide of another group 3 element. Thus, the temperature at which the liquid phase of the sintering additives is formed can be reduced to a temperature lower than a temperature at which the evaporation of MgO is significant. The formed article is maintained at 1,325° C. to 1,375° C. for a predetermined period of time to sufficiently form the liquid phase at a low temperature before the MgO evaporates significantly in the sintering step. Rearrangement attributed to the formation of the liquid phase reduces the volume thereof and open pores. Thus, even when MgO evaporates, leaks of MgO can be prevented. This results in only a small difference in magnesium concentration (on an oxide basis) between the surface layer and the inside, thereby leading to the sintered product that is uniform and densified compared with the related art.

An atmosphere used during sintering mainly contains nitrogen. The atmosphere may contain traces of oxygen to the extent that the sintered product of silicon nitride is not oxidized in the sintering step. The atmosphere may further contain the components such as SiO and MgO evaporated from the silicon nitride formed article and another material arranged together with the formed article.

In particular, sintering is preferably performed in a nitrogen atmosphere intentionally containing oxygen, silicon, and magnesium. An example of such an atmosphere containing oxygen, silicon, and magnesium is an atmosphere containing SiO and MgO.

Among the components incorporated as the sintering additives, the oxide components of lanthanum and aluminum do not easily evaporate. The oxide components of magnesium and silicon evaporate easily as SiO and MgO. The intentional incorporation of the components such as SiO and MgO into the atmosphere suppresses the decomposition of $SiO_2$ compounded as the sintering additive and $SiO_2$ contained in the silicon nitride material and the evaporation of MgO during sintering. It is possible to provide conditions such that no evaporation of MgO occurs during sintering.

This facilitates production of the dense sintered product even at a small amount of the additives compounded. Such an atmosphere can be formed as follows: For example, a mixed powder of Si, $SiO_2$, and a MgO powder or a mixed powder of a silicon nitride powder and a MgO powder are placed or laid in a sintering pot together with a formed article to be formed into the sintered product of silicon nitride according to this embodiment by sintering. Alternatively, one of the mixed powders is arranged around the formed article to be formed into the sintered product of silicon nitride according to this embodiment by sintering. The mixed powder is sintered together with the formed article to be formed into the sintered product of silicon nitride according to this embodiment, evaporating Si and Mg. Thereby, the atmosphere can be formed.

To form the silicon nitride crystal grains each having a small grain size and to suppress the abnormal grain growth of the silicon nitride crystal grains as described above, it is important to initiate the densification at a low temperature to suppress the grain growth at a high temperature. To increase the relative density, it is important to promote densification at a low temperature at which grain growth is not significant and then raise the temperature to attain sufficient densification. Preferably, the formed article is sintered at 1,650° C. to 1,850° C. in a nitrogen atmosphere and is then subjected to hot isostatic pressing at a pressure of 9.8 MPa to 294 MPa and at a temperature of 1,500° C. to 1,700° C.

Thereby, there is provided the dense sintered product of silicon nitride having suppressed abnormal grain growth of the silicon nitride crystal grains and having improved chipping resistance.

Cutting Tool

A tool composed of the sintered product of silicon nitride according to this embodiment has improved wear resistance and chipping resistance. Such a tool is preferably used as a cutting tool particularly requiring high wear resistance and chipping resistance.

Figure 2:
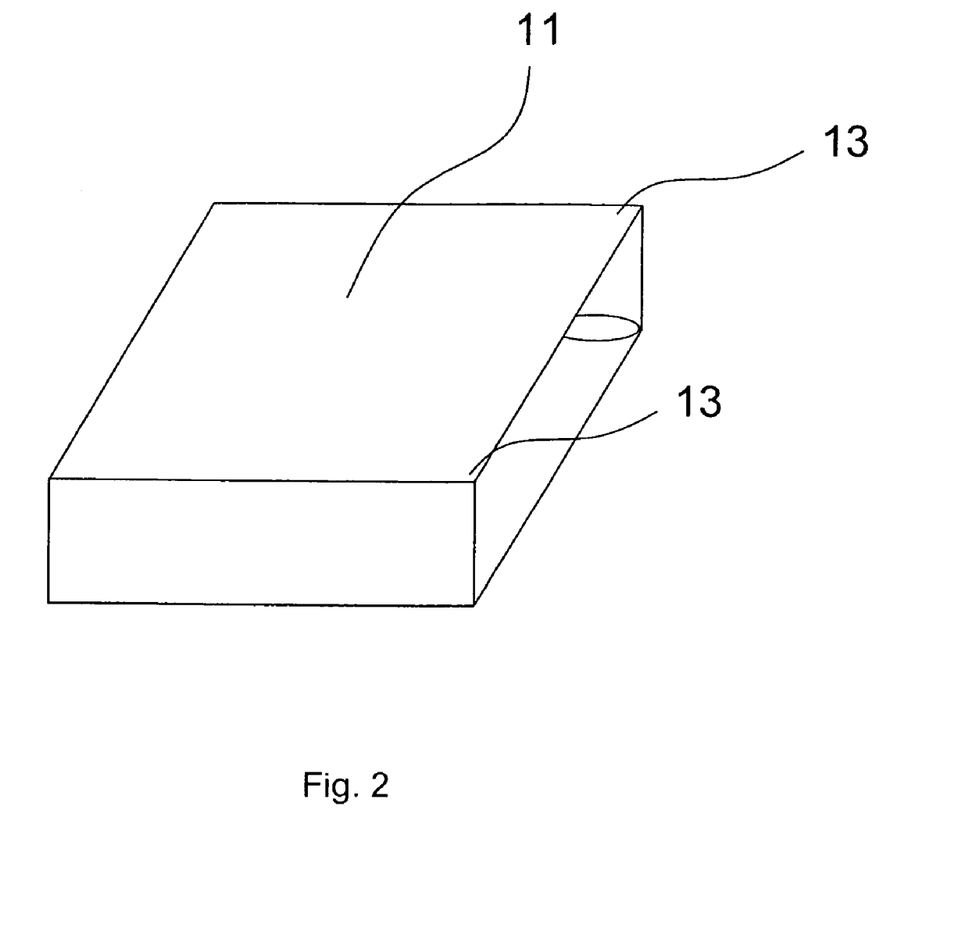
FIG. 2 is a perspective view of a cutting tool according to an embodiment.

As shown in FIG. 2, in the case where the sintered product is used as a cutting tool 11, the cutting tool 11 may have a rectangular flat structure provided with a cutting edge 13 at corners. Alternatively, the cutting tool 11 may have a known structure.

With respect to a method for producing the cutting tool, in the method for producing the sintered product of silicon nitride, the mixed powder is formed into an intended shape of the cutting tool to easily produce the cutting tool composed of the sintered product of silicon nitride according to this embodiment. Alternatively, after sintering, the sintered product may also be formed into the shape of the cutting tool by grinding, polishing, and the like. Furthermore, the surface of the cutting edge of the cutting tool composed of the sintered product of silicon nitride according to this embodiment may be coated with, for example, TiN or TiAlN.

In the case where a workpiece is cut with the cutting tool described above, the resulting workpiece has improved dimensional accuracy because the cutting tool has improved wear resistance and chipping resistance. The cutting tool has improved durability. Thus, cutting can be performed without replacement of the cutting tool over long periods of time, thereby reducing a period of time for replacement of the cutting tool.

A cutting apparatus including the cutting tool can be produced (not shown). Examples of the cutting apparatus include turning apparatuses such as lathes; and milling apparatuses such as machining centers. In this case, cutting can be performed without replacement of the cutting tool over long periods of time. This reduces the number of cutting-tool changes, thus reducing costs.

The present invention will be described in further detail by way of EXAMPLES. The present invention is not limited to EXAMPLES described below.

EXAMPLE 1

A silicon nitride powder having an average particle size of 0.3 μm, lanthanum hydroxide ($La(OH)_3$) having an average particle size of 1.2 μm and containing Ce, Pr, and Nd, as impurities, in a total amount of 1% by mass or less, aluminum oxide having an average particle size of 0.7 μm, magnesium hydroxide having an average particle size of 2.5 μm, and a $WO_3$ powder or a $MoSi_2$ powder, which was used as a powdered compound of an element in group 6 of the periodic table, having an average particle size of 0.1 μm were prepared as starting materials.

A binder and a solvent were added to these material powders. The resulting mixture was pulverized and mixed with a ball mill for 72 hours and dried to remove the solvent to afford a granulated powder. The granulated powder was formed into formed articles each having a cutting-tool shape of SNGN 120412 by pressing at 98 MPa.

After the formed articles were calcined, the formed articles were sintered at temperatures shown in Table 2 for 5 hours in a $N_2$ atmosphere under atmospheric pressure and were then subjected to hot isostatic pressing (HIP) at a temperature of 1,600° C. and pressure of 196 MPa for 2 hours to afford sintered products.

Only Sample 34 was not subjected to hot isostatic pressing (HIP) but sintered under atmospheric pressure alone.

The density of the resulting sintered products of silicon nitride was measured by the Archimedes method and converted into relative density. Table 2 shows the results.

The amount of oxygen in each of the sintered products was measured by infrared absorption spectrometry with powders prepared by pulverizing the sintered products.

The cross sections of the resulting sintered products were mirror finished. The mirror-finished cross sections were etched in 46% by mass hydrofluoric acid for 2 hours. Ten photographs of the etched cross sections of the sintered products of silicon nitride were taken in a field of view of 0.015 $mm^2$ with an electron microscope. In these photographs, the number of silicon nitride crystal grains each having a length of 10 μm or more was counted. The total number of the silicon nitride crystal grains each having a length of 10 μm or more in the 10 photographs is shown in Table 2 as the number of the crystal grains each having a length of 10 μm or more in a field of view of 0.15 $mm^2$.

One photograph of each of Samples 5 and 24 was taken in a field of view of 0.015 $mm^2$ with the electron microscope. In each photograph, six silicon nitride crystal grains from the longest ones were selected. The lengths thereof were measured, and the average length was determined. Sample 5 containing La had an average length of 4.5 μm. Sample 24 containing Y had an average length of 11 μm.

Compositions of the sintered products were determined by inductively coupled plasma (ICP) spectrometry and oxygen analysis. Table 1 shows the results. The total amounts of the oxide of an element in group 3 of the periodic table ($RE_2O_3$), $Al_2O_3$, and MgO were determined. Table 1 shows the results. The remainder calculated by subtracting this total amount and the amount of the compound of an element in group 6 of the periodic table from the whole amount was defined as the amount of silicon nitride in each sample. The proportion of the rare-earth elements except lanthanum in each sintered product was 0.03% by mass on an oxide basis.

The crystal phase of each of the resulting sintered products was identified from an X-ray diffraction pattern. The results demonstrated that silicon nitride, or silicon nitride, $WSi_2$, and $MoSi_2$ were present.

Cutting tools were produced with the resulting sintered products of silicon nitride. A turning test was performed under the following conditions: workpiece: FCD-450 (module cast iron), cutting speed: 500 m/min, feed speed: 0.2 mm/rev, cutting depth: 2.0 mm, and cutting time: 120 s. A milling test was performed under the following conditions: workpiece: FCD-450 (module cast iron), cutting speed: 500 m/min, feed speed: 0.5 mm/tooth, cutting depth: 2.0 mm, and number of passes: 10 passes. The amount of flank wear of each cutting edge was determined after the turning test by photographing the cutting edge with a microscope equipped with a length measuring machine and measuring the amount of wear, and calculating the mean value of the amount of wear. Chipping of each cutting edge was determined after the milling test by photographing the cutting edge with a microscope and determining the area of the chipping region. Table 2 shows the evaluation results.

In Tables 1 and 2, samples indicated as outside the scope of the invention are COMPARATIVE EXAMPLES.

TABLE 2

| Sample | Sintering temperature (° C.) | Relative density (%) | Number of coarse grains with 10 m or more in 0.15 mm$^2$ | Amount of flank wear (m) | Chipping area (mm$^2$) |
| --- | --- | --- | --- | --- | --- |
| *1 | 1750 | 97 | 4 | — | — |
| 2 | 1750 | 99 | 5 | 280 | 0.12 |
| 3 | 1750 | 99 | 5 | 270 | 0.11 |
| 4 | 1750 | 100 | 5 | 250 | 0.10 |
| 5 | 1750 | 100 | 4 | 220 | 0.10 |
| 6 | 1650 | 100 | 2 | 210 | 0.10 |
| 7 | 1800 | 100 | 6 | 250 | 0.12 |
| 8 | 1750 | 100 | 4 | 240 | 0.10 |
| 9 | 1750 | 100 | 3 | 300 | 0.10 |
| *10 | 1750 | 100 | 3 | 410 | 0.10 |
| *11 | 1750 | 100 | 3 | 440 | 0.10 |
| 12 | 1750 | 99 | 4 | 280 | 0.12 |
| 13 | 1750 | 100 | 4 | 270 | 0.11 |
| 14 | 1750 | 100 | 5 | 240 | 0.10 |
| 15 | 1750 | 100 | 5 | 250 | 0.10 |
| *16 | 1750 | 100 | 5 | 410 | 0.10 |
| *17 | 1750 | 100 | 5 | 430 | 0.10 |
| 18 | 1750 | 100 | 4 | 280 | 0.10 |
| 19 | 1750 | 100 | 4 | 280 | 0.10 |
| 20 | 1750 | 100 | 4 | 300 | 0.10 |
| *21 | 1750 | 100 | 5 | 440 | 0.10 |
| *22 | 1750 | 100 | 10 | 320 | 0.20 |
| *23 | 1750 | 100 | 10 | 310 | 0.18 |
| *24 | 1750 | 100 | 10 | 300 | 0.17 |

TABLE 1

| Sample | $RE_2O_3$ | $RE_2O_3$ (mass %) | $Al_2O_3$ (mass %) | MgO (mass %) | Total (mass %) | Amount of oxygen (mass %) | Type of compound of group 6 element | Compound of Group 6 element (mass %) | Amount of silicon nitride (mass %) |
| --- | --- | --- | --- | --- | --- | --- | --- | --- | --- |
| *1 | — | — | 0.40 | 0.50 | 0.90 | 1.59 | — | — | 99.1 |
| 2 | $La_2O_3$ | 0.10 | 0.40 | 0.50 | 1.00 | 1.60 | — | — | 99 |
| 3 | $La_2O_3$ | 0.50 | 0.40 | 0.50 | 1.40 | 1.66 | — | — | 98.6 |
| 4 | $La_2O_3$ | 1.00 | 0.40 | 0.50 | 1.90 | 1.73 | — | — | 98.1 |
| 5 | $La_2O_3$ | 1.50 | 0.40 | 0.50 | 2.40 | 1.81 | — | — | 97.6 |
| 6 | $La_2O_3$ | 1.50 | 0.40 | 0.50 | 2.40 | 1.81 | — | — | 97.6 |
| 7 | $La_2O_3$ | 1.50 | 0.40 | 0.50 | 2.40 | 1.81 | — | — | 97.6 |
| 8 | $La_2O_3$ | 2.00 | 0.40 | 0.50 | 2.90 | 1.88 | — | — | 97.1 |
| 9 | $La_2O_3$ | 2.50 | 0.40 | 0.50 | 3.40 | 1.96 | — | — | 96.6 |
| *10 | $La_2O_3$ | 3.00 | 0.40 | 0.50 | 3.90 | 2.03 | — | — | 96.1 |
| *11 | $La_2O_3$ | 2.40 | 0.80 | 0.80 | 4.00 | 2.65 | — | — | 96 |
| 12 | $La_2O_3$ | 1.50 | 0.05 | 0.50 | 2.05 | 1.64 | — | — | 97.95 |
| 13 | $La_2O_3$ | 1.50 | 0.10 | 0.50 | 2.10 | 1.67 | — | — | 97.9 |
| 14 | $La_2O_3$ | 1.50 | 0.20 | 0.50 | 2.20 | 1.71 | — | — | 97.8 |
| 15 | $La_2O_3$ | 1.50 | 0.50 | 0.50 | 2.50 | 1.85 | — | — | 97.5 |
| *16 | $La_2O_3$ | 1.50 | 0.75 | 0.50 | 2.75 | 1.97 | — | — | 97.25 |
| *17 | $La_2O_3$ | 1.50 | 2.00 | 0.50 | 4.00 | 2.56 | — | — | 96 |
| 18 | $La_2O_3$ | 1.50 | 0.40 | 0.30 | 2.20 | 1.73 | — | — | 97.8 |
| 19 | $La_2O_3$ | 1.50 | 0.40 | 1.00 | 2.90 | 2.01 | — | — | 97.1 |
| 20 | $La_2O_3$ | 1.50 | 0.40 | 1.50 | 3.40 | 2.20 | — | — | 96.6 |
| *21 | $La_2O_3$ | 1.50 | 0.40 | 2.00 | 3.90 | 2.40 | — | — | 96.1 |
| *22 | $Lu_2O_3$ | 1.50 | 0.40 | 0.50 | 2.40 | 1.77 | — | — | 97.6 |
| *23 | $Er_2O_3$ | 1.50 | 0.40 | 0.50 | 2.40 | 1.78 | — | — | 97.6 |
| *24 | $Y_2O_3$ | 1.50 | 0.40 | 0.50 | 2.40 | 1.78 | — | — | 97.6 |
| 25 | $La_2O_3$ | 1.50 | 0.40 | 0.50 | 2.40 | 1.81 | $WSi_2$ | 0.5 | 97.1 |
| 26 | $La_2O_3$ | 1.50 | 0.40 | 0.50 | 2.40 | 1.81 | $MoSi_2$ | 0.5 | 97.1 |
| *27 | $La_2O_3$ | 1.50 | — | 0.50 | 2.00 | 1.62 | — | — | 98 |
| *28 | $La_2O_3$ | 1.50 | 0.40 | 0.20 | 2.10 | 1.69 | — | — | 97.9 |
| 29 | $La_2O_3$ | 1.50 | 0.40 | 0.50 | 2.40 | 1.81 | $WSi_2$ | 0.1 | 97.5 |
| 30 | $La_2O_3$ | 1.50 | 0.40 | 0.50 | 2.40 | 1.81 | $WSi_2$ | 1.0 | 96.6 |
| 31 | $La_2O_3$ | 1.50 | 0.40 | 0.50 | 2.40 | 1.81 | $WSi_2$ | 2.0 | 95.6 |
| 32 | $La_2O_3$ | 1.50 | 0.40 | 0.50 | 2.40 | 1.81 | $WSi_2$ | 3.0 | 94.6 |
| 33 | $La_2O_3$ | 1.50 | 0.20 | 0.50 | 2.20 | 1.71 | — | — | 97.8 |
| 34 | $La_2O_3$ | 1.50 | 0.20 | 0.50 | 2.20 | 1.71 | — | — | 97.8 |

Samples with asterisks are out of the scope of the present invention.
"—" indicates a level below the detection limit.

TABLE 2-continued

| Sample | Sintering temperature (° C.) | Relative density (%) | Number of coarse grains with 10 m or more in 0.15 mm² | Amount of flank wear (m) | Chipping area (mm²) |
|---|---|---|---|---|---|
| 25 | 1750 | 100 | 4 | 180 | 0.08 |
| 26 | 1750 | 100 | 4 | 200 | 0.09 |
| *27 | 1750 | 97 | 4 | 440 | 0.22 |
| *28 | 1750 | 98 | 4 | 400 | 0.20 |
| 29 | 1750 | 100 | 4 | 200 | 0.09 |
| 30 | 1750 | 100 | 4 | 220 | 0.08 |
| 31 | 1750 | 100 | 4 | 270 | 0.09 |
| 32 | 1750 | 100 | 4 | 300 | 0.10 |
| 33 | 1850 | 100 | 8 | 270 | 0.14 |
| 34 | 1750 | 98 | 5 | 300 | 0.15 |

Samples with asterisks are out of the scope of the present invention.

Tables 1 and 2 demonstrated that Samples 2 to 9, 12 to 15, 18 to 20, 25, 26, and 29 to 34, which were within the scope of the present invention, each demonstrated cutting performance with only a small amount of wear and only a slight chipping of the cutting edge.

In contrast, in each of Samples 10, 11, 16, 17, 21 to 24, 27, and 28 (COMPARATIVE EXAMPLES), a large amount of wear and a large chipping area were observed in the cutting tests. In Sample 1 (COMPARATIVE EXAMPLE), the cutting edge was fractured during the test.

As described above, the sintered product of silicon nitride of the present invention prevents fracture, wear, and chipping to improve cutting properties and extends tool life.

EXAMPLE 2

A silicon nitride powder having an average particle size of 0.3 μm, lanthanum hydroxide (La(OH)$_3$) having an average particle size of 1.2 μm and containing Ce, Pr, and Nd, as impurities, in a total amount of 1% by mass or less, aluminum oxide having an average particle size of 0.7 μm, magnesium hydroxide having an average particle size of 2.5 μm, and a WO$_3$ powder or a MoSi$_2$ powder, which was used as a powdered compound of an element in group 6 of the periodic table, having an average particle size of 0.1 μm were prepared as starting materials.

A binder and a solvent were added to these material powders. The resulting mixture was pulverized and mixed with a ball mill for 72 hours and dried to remove the solvent to afford a granulated powder. The granulated powder was formed into formed articles each having a cutting-tool shape of SNGN 120412 by pressing at 98 MPa.

After the formed articles were calcined, the formed articles were sintered at temperatures shown in Table 3 for 5 hours in a N$_2$ atmosphere under atmospheric pressure and were then subjected to hot isostatic pressing (HIP) at a temperature of 1,600° C. and pressure of 196 MPa for 2 hours to afford sintered products.

The density of the resulting sintered products of silicon nitride was measured by the Archimedes method and converted into relative density. Samples of the present invention had a relative density of 99% or more.

In a 50-μm² area of any cross section of each of the sintered products, the mean depth of the depressions, average grain size, and average aspect ratio of the silicon nitride crystal grains of each of the resulting sintered products of silicon nitride, and the proportion of the area of the needle-like silicon nitride crystal grains each having the depression with a depth of 50 nm or more were determined with a transmission electron microscope (TEM). The number of number of crystal grains each having a length of 10 μm or more in a field of view of 0.15 mm² was determined as in EXAMPLE 1. Table 4 shows the results.

The amount of oxygen in each of the sintered products was measured by infrared absorption spectrometry with powders prepared by pulverizing the sintered products.

Compositions of the grain-boundary phases were determined by ICP spectrometry and oxygen analysis. Table 3 shows the results. The remainder calculated by subtracting the amount of the grain-boundary phase or amounts of the grain-boundary phase and the compound of an element in group 6 of the periodic table from the whole amount was defined as the amount of silicon nitride in each sample. The proportion of the rare-earth elements except lanthanum in each sintered product was 0.03% by mass or less on an oxide basis.

Cutting tools as shown in FIG. 2 were produced with the resulting sintered products of silicon nitride. A turning test was performed under the following conditions: workpiece: FCD-450 (module cast iron), cutting speed: 500 m/min, feed speed: 0.2 mm/rev, cutting depth: 2.0 mm, and cutting time: 120 s. A milling test was performed under the following conditions: workpiece: FCD-450 (module cast iron), cutting speed: 500 m/min, feed speed: 0.5 mm/tooth, cutting depth: 2.0 mm, and number of passes: 10 passes. The amount of flank wear of each cutting edge was determined after the turning test by photographing the cutting edge with a microscope equipped with a length measuring machine and measuring the amount of wear, and calculating the mean value of the amount of wear. Chipping of each cutting edge was determined after the milling test by photographing the cutting edge with a microscope after the test and determining the area of the chipping region. Table 4 shows the evaluation results.

In Tables 3 and 4, samples indicated as outside the scope of the invention are COMPARATIVE EXAMPLES.

TABLE 3

| Sample | RE$_2$O$_3$ | RE$_2$O$_3$ (mass %) | Al$_2$O$_3$ (mass %) | MgO (mass %) | Total (mass %) | Amount of silicon nitride (mass %) | Amount of oxygen (mass %) | Type of compound of group 6 element | Compound of Group 6 element (mass %) | Sintering temperature (° C.) |
|---|---|---|---|---|---|---|---|---|---|---|
| 1 | La$_2$O$_3$ | 0.10 | 0.40 | 0.50 | 1.00 | 99.00 | 1.60 | — | — | 1800 |
| 2 | La$_2$O$_3$ | 0.50 | 0.40 | 0.50 | 1.40 | 98.60 | 1.66 | — | — | 1800 |
| 3 | La$_2$O$_3$ | 1.00 | 0.40 | 0.50 | 1.90 | 98.10 | 1.73 | — | — | 1800 |
| 4 | La$_2$O$_3$ | 1.50 | 0.40 | 0.50 | 2.40 | 97.60 | 1.81 | — | — | 1850 |
| 5 | La$_2$O$_3$ | 2.00 | 0.40 | 0.50 | 2.90 | 97.10 | 1.88 | — | — | 1800 |
| 6 | La$_2$O$_3$ | 2.50 | 0.50 | 0.50 | 3.50 | 96.50 | 2.00 | — | — | 1800 |
| *7 | La$_2$O$_3$ | 2.40 | 0.80 | 0.80 | 4.00 | 96.00 | 2.65 | — | — | 1800 |
| 8 | La$_2$O$_3$ | 1.50 | 0.05 | 0.50 | 2.05 | 97.95 | 1.64 | — | — | 1800 |
| 9 | La$_2$O$_3$ | 1.50 | 0.10 | 0.50 | 2.10 | 97.90 | 1.67 | — | — | 1800 |

TABLE 3-continued

| Sample | RE$_2$O$_3$ | RE$_2$O$_3$ (mass %) | Al$_2$O$_3$ (mass %) | MgO (mass %) | Total (mass %) | Amount of silicon nitride (mass %) | Amount of oxygen (mass %) | Type of compound of group 6 element | Compound of Group 6 element (mass %) | Sintering temperature (° C.) |
|---|---|---|---|---|---|---|---|---|---|---|
| 10 | La$_2$O$_3$ | 1.50 | 0.20 | 0.50 | 2.20 | 97.80 | 1.71 | — | — | 1800 |
| 11 | La$_2$O$_3$ | 1.50 | 0.50 | 0.50 | 2.50 | 97.50 | 1.85 | — | — | 1800 |
| 12 | La$_2$O$_3$ | 1.50 | 0.40 | 0.30 | 2.20 | 97.80 | 1.73 | — | — | 1800 |
| 13 | La$_2$O$_3$ | 1.50 | 0.40 | 1.00 | 2.90 | 97.10 | 2.01 | — | — | 1800 |
| 14 | La$_2$O$_3$ | 1.50 | 0.40 | 1.50 | 3.40 | 96.60 | 2.20 | — | — | 1800 |
| *15 | Lu$_2$O$_3$ | 1.50 | 0.40 | 0.50 | 2.40 | 97.60 | 1.77 | — | — | 1800 |
| *16 | Er$_2$O$_3$ | 1.50 | 0.40 | 0.50 | 2.40 | 97.60 | 1.78 | — | — | 1800 |
| *17 | Y$_2$O$_3$ | 1.50 | 0.40 | 0.50 | 2.40 | 97.60 | 1.78 | — | — | 1800 |
| 18 | La$_2$O$_3$ | 1.50 | 0.40 | 0.50 | 2.40 | 97.10 | 1.81 | WSi$_2$ | 0.5 | 1800 |
| 19 | La$_2$O$_3$ | 1.50 | 0.40 | 0.50 | 2.40 | 97.10 | 1.81 | MoSi$_2$ | 0.5 | 1800 |

Samples with asterisks are out of the scope of the present invention.

TABLE 4

| Sample | Relative density (%) | Depth of depression (nm) | Silicon nitride grain area proportion of acicular grain (%) | Average grain size (m) | Aspect ratio | Number of coarse grains with 10 m or more in 0.15 mm$^2$ | Amount of flank wear (m) | Chipping area (mm$^2$) |
|---|---|---|---|---|---|---|---|---|
| 1 | 99 | 50 | 33 | 0.25 | 2.8 | 1 | 210 | 0.15 |
| 2 | 99 | 53 | 53 | 0.26 | 3.3 | 2 | 226 | 0.13 |
| 3 | 100 | 61 | 56 | 0.31 | 3.7 | 3 | 234 | 0.11 |
| 4 | 100 | 100 | 66 | 0.45 | 4.7 | 6 | 204 | 0.12 |
| 5 | 100 | 117 | 70 | 0.4 | 4.5 | 4 | 250 | 0.07 |
| 6 | 100 | 125 | 84 | 0.43 | 4.8 | 6 | 300 | 0.06 |
| *7 | 100 | 100 | 50 | 1.14 | 5.2 | 9 | 440 | 0.10 |
| 8 | 99 | 71 | 37 | 0.25 | 3.3 | 4 | 238 | 0.11 |
| 9 | 100 | 77 | 44 | 0.28 | 3.5 | 4 | 241 | 0.10 |
| 10 | 100 | 83 | 53 | 0.3 | 3.7 | 5 | 247 | 0.09 |
| 11 | 100 | 94 | 61 | 0.36 | 4.4 | 5 | 270 | 0.08 |
| 12 | 100 | 85 | 58 | 0.29 | 2.9 | 4 | 240 | 0.10 |
| 13 | 100 | 87 | 55 | 0.44 | 4.5 | 4 | 278 | 0.13 |
| 14 | 100 | 86 | 57 | 0.5 | 4.9 | 4 | 300 | 0.15 |
| *15 | 100 | 17 | 60 | 0.61 | 5.3 | 12 | 350 | 0.22 |
| *16 | 100 | 17 | 65 | 0.62 | 5.4 | 12 | 340 | 0.20 |
| *17 | 100 | 15 | 70 | 0.65 | 5.6 | 14 | 340 | 0.20 |
| 18 | 100 | 86 | 58 | 0.35 | 4.3 | 5 | 245 | 0.07 |
| 19 | 100 | 88 | 57 | 0.35 | 4.2 | 4 | 240 | 0.08 |

Samples with asterisks are out of the scope of the present invention.

Tables 3 and 4 demonstrated that Samples 1 to 6, 8 to 14, 18, and 19, which were within the scope of the present invention, each had a small amount of wear of 300 μm or less and a chipping area of the cutting edge of 0.15 mm$^2$ or less, as cutting performance.

In contrast, in Sample 7, a COMPARATIVE EXAMPLE having a large amount of the grain-boundary phase, a large amount of wear was observed in the cutting tests. Samples 15 to 17 (COMPARATIVE EXAMPLES), containing rare-earth elements except lanthanum, each had a depth of the depression of 17 μm or less. Also, large amounts of wear and large chipping areas were observed.

EXAMPLE 3

A silicon nitride powder having an average particle size of 0.3 μm, lanthanum hydroxide (La(OH)$_3$) having an average particle size of 1.2 μm and containing Ce, Pr, and Nd, as impurities, in a total amount of 1% by mass or less, aluminum oxide having an average particle size of 0.7 μm, and magnesium hydroxide having an average particle size of 2.5 μm were prepared as starting materials.

A binder and a solvent were added to these material powders. The resulting mixture was pulverized and mixed with a ball mill for 72 hours and dried to remove the solvent to afford a granulated powder. The granulated powder was formed into formed articles each having a cutting-tool shape of SNGN 120412 by pressing at 98 MPa.

After the formed articles were calcined, the formed articles were sintered at 1,350° C. for a period of time shown in Table 5 and then 1,750° C. for 5 hours in a N$_2$ atmosphere under atmospheric pressure. Subsequently, the formed articles were subjected to hot isostatic pressing (HIP) at a temperature of 1,600° C. and pressure of 196 MPa for 2 hours to afford sintered products.

The density of the resulting sintered products of silicon nitride was measured by the Archimedes method and converted into relative density. The relative densities of all Samples were 100%.

The amount of oxygen in each of the sintered products was measured by infrared absorption spectrometry with powders prepared by pulverizing the sintered products. For each of the surface layers of the sintered products, a portion from the surface to 0.3 mm in depth of each sintered product was collected and measured. For each of the insides of the sintered products, a portion from 0.3 to 0.7 mm in depth of each sintered product was collected and measured.

The surfaces of the resulting sintered products of silicon nitride were ground away to a depth of 0.3 mm and 1.0 mm by surface grinding. Composition analysis was performed on each of the exposed surfaces by X-ray fluorescence analysis. Table 5 shows amounts of MgO, oxides of rare-earth elements $Re_2O_3$, and $Al_2O_3$, and the difference in MgO concentration (subtraction of the amount of MgO in the surface layer from the amount of MgO in the inside of each sample).

The proportions of the areas of the grain-boundary phases were determined by mirror-finishing the resulting surfaces, immersing the mirror-finished surfaces in a solution containing 23% by mass hydrofluoric acid and 77% by mass water in a vessel, heating the vessel in a water bath having a temperature of 50° C. for 3 hours to etch the grain-boundary phases, photographing the surfaces in a field of view of 0.015 mm² with a scanning electron microscope (×1,000), and determining the proportions of void areas in the photographs by image analysis equipment. The proportions were defined as the proportions of the areas of the grain-boundary phases. Table 6 shows the results.

Cutting tools as shown in FIG. 2 were produced with the resulting sintered products of silicon nitride. A turning test was performed under the following conditions: workpiece: FCD-450 (module cast iron), cutting speed: 500 m/min, feed speed: 0.2 mm/rev, cutting depth: 2.0 mm, and cutting time: 120 s. A milling test was performed under the following conditions: workpiece: FCD-450 (module cast iron), cutting speed: 500 m/min, feed speed: 0.5 mm/tooth, cutting depth: 2.0 mm, and number of passes: 10 passes. The amount of flank wear of each cutting edge was determined after the turning test by photographing the cutting edge with a microscope equipped with a length measuring machine and measuring the amount of wear, and calculating the mean value of the amount of wear. Chipping of each cutting edge was determined after the milling test by photographing the cutting edge with a microscope and determining the area of the chipping region. Table 6 shows the evaluation results.

In Sample 12, $Y_2O_3$ was used as the oxide of the rare-earth element ($Re_2O_3$). In Sample 13, $Er_2O_3$ was used as the oxide of the rare-earth element ($Re_2O_3$).

In Sample 14, a MgO powder was arranged around the formed article and sintered together with the formed article. Table 6 shows the results.

In Tables 5 and 6, samples indicated as outside the scope of the invention are COMPARATIVE EXAMPLES.

TABLE 5

| Sample | Holding time at 1350° C. h | Analyzed portion | RE₂O₃ | RE₂O₃ (mass %) | Al₂O₃ (mass %) | MgO (mass %) | Amount of oxygen (mass %) | Total (mass %) | Difference in MgO content between inside and surface layer (mass %) |
|---|---|---|---|---|---|---|---|---|---|
| 1 | 5 | Surface layer | La₂O₃ | 0.1 | 0.4 | 0.5 | 1.6 | 1.0 | 0.2 |
|   |   | Inside | La₂O₃ | 0.1 | 0.4 | 0.7 | 1.7 | 1.2 |   |
| 2 | 6 | Surface layer | La₂O₃ | 1.5 | 0.3 | 0.7 | 1.9 | 2.5 | 0.3 |
|   |   | Inside | La₂O₃ | 1.5 | 0.3 | 1.0 | 2.0 | 2.8 |   |
| 3 | 4 | Surface layer | La₂O₃ | 1.5 | 0.3 | 0.8 | 1.9 | 2.6 | 0.4 |
|   |   | Inside | La₂O₃ | 1.5 | 0.3 | 1.2 | 2.0 | 3.0 |   |
| 4 | 3 | Surface layer | La₂O₃ | 1.7 | 0.4 | 0.5 | 1.8 | 2.5 | 0.5 |
|   |   | Inside | La₂O₃ | 1.6 | 0.4 | 1.0 | 2.0 | 3.0 |   |
| 5 | 5 | Surface layer | La₂O₃ | 1.4 | 0.3 | 1.3 | 2.1 | 3.0 | 0.5 |
|   |   | Inside | La₂O₃ | 1.4 | 0.3 | 1.8 | 2.3 | 3.5 |   |
| 6 | 5 | Surface layer | La₂O₃ | 1.7 | 0.4 | 0.8 | 1.9 | 2.8 | 0.5 |
|   |   | Inside | La₂O₃ | 1.6 | 0.4 | 1.3 | 2.1 | 3.3 |   |
| 7 | 5 | Surface layer | La₂O₃ | 2.5 | 0.4 | 0.5 | 2.0 | 3.4 | 0.2 |
|   |   | Inside | La₂O₃ | 2.4 | 0.4 | 0.7 | 2.0 | 3.5 |   |
| 8 | 5 | Surface layer | La₂O₃ | 1.5 | 0.05 | 0.5 | 1.6 | 2.1 | 0.2 |
|   |   | Inside | La₂O₃ | 1.5 | 0.05 | 0.7 | 1.7 | 2.3 |   |
| 9 | 5 | Surface layer | La₂O₃ | 1.5 | 0.5 | 0.5 | 1.9 | 2.5 | 0.2 |
|   |   | Inside | La₂O₃ | 1.5 | 0.5 | 0.7 | 1.9 | 2.7 |   |
| *10 | 0 | Surface layer | La₂O₃ | 1.8 | 0.4 | 1.2 | 2.1 | 3.4 | 0.6 |
|   |   | Inside | La₂O₃ | 1.6 | 0.4 | 1.8 | 2.3 | 3.8 |   |
| *11 | 3 | Surface layer | La₂O₃ | 1.7 | 0.3 | 1.5 | 2.2 | 3.5 | 0.5 |
|   |   | Inside | La₂O₃ | 1.6 | 0.3 | 2.0 | 2.4 | 3.9 |   |
| *12 | 0 | Surface layer | Y₂O₃ | 1.7 | 0.3 | 0.3 | 1.7 | 2.3 | 0.7 |
|   |   | Inside | Y₂O₃ | 1.7 | 0.3 | 1.0 | 2.0 | 3.0 |   |
| *13 | 0 | Surface layer | Er₂O₃ | 1.7 | 0.4 | 0.3 | 1.8 | 2.4 | 0.8 |
|   |   | Inside | Er₂O₃ | 1.6 | 0.4 | 1.1 | 2.1 | 3.1 |   |
| 14 | 6 | Surface layer | La₂O₃ | 1.5 | 0.3 | 0.7 | 1.9 | 2.5 | 0.1 |
|   |   | Inside | La₂O₃ | 1.5 | 0.3 | 0.8 | 1.9 | 2.6 |   |

Samples with asterisks are out of the scope of the present invention.

TABLE 6

| Sample | Area proportion of grain-boundary phase (%) | Amount of flank wear (m) | Chipping area (mm²) |
|---|---|---|---|
| 1 | 7 / 7 | 210 | 0.05 |
| 2 | 7 / 8 | 180 | 0.06 |
| 3 | 7 / 8 | 190 | 0.07 |
| 4 | 6 / 7 | 200 | 0.08 |

TABLE 6-continued

| Sample | Area proportion of grain-boundary phase (%) | Amount of flank wear (m) | Chipping area (mm²) |
|---|---|---|---|
| 5 | 78 | 210 | 0.09 |
| 6 | 67 | 210 | 0.09 |
| 7 | 78 | 210 | 0.09 |
| 8 | 78 | 210 | 0.08 |
| 9 | 78 | 210 | 0.09 |
| *10 | 89 | 300 | 0.10 |
| *11 | 1215 | 440 | 0.10 |
| *12 | 67 | 430 | 0.24 |
| *13 | 56 | 430 | 0.24 |
| 14 | 78 | 160 | 0.05 |

Samples with asterisks are out of the scope of the present invention.

The results shown in Tables 5 and 6 demonstrated that Samples 1 to 9, which were within the range of the present invention, each exhibit cutting performance with only a small amount of wear and only a slight chipping of the cutting edge. In contrast, in each of Samples 10 and 11 of COMPARATIVE EXAMPLES, a large amount of wear was observed in the cutting tests. In each of Sample 12 containing Y as a rare-earth element and Sample 13 containing Er as a rare-earth element of COMPARATIVE EXAMPLES, a large amount of wear and a large chipping area were observed.

What is claimed is:

1. A sintered product of silicon nitride, comprising:
   a crystal phase mainly including silicon nitride crystals; and
   an amorphous grain-boundary phase containing lanthanum, aluminum, magnesium, silicon, and oxygen,
   wherein the sintered product contains 0.1% by mass or more of lanthanum on an oxide basis, 0.05% to 0.6% by mass of aluminum on an oxide basis, 0.3% by mass or more of magnesium on an oxide basis, and 2.5% by mass or less of oxygen, and
   wherein the total amount of lanthanum on an oxide basis, aluminum on an oxide basis, and magnesium on an oxide basis is 3.5% by mass or less in the sintered product.

2. The sintered product of silicon nitride according to claim 1, wherein the silicon nitride crystal grains are needle-like, and
   wherein among the crystal grains, the number of crystal grains each having a length of 10 μm or more is six or less in a field of view of a cross section of the sintered product of 0.15 mm².

3. The sintered product of silicon nitride according to claim 1, wherein the sintered product contains 0.1% to 2% by mass of a silicide of an element in group 6 of the periodic table.

4. The sintered product of silicon nitride according to claim 3, wherein the element in group 6 of the periodic table is tungsten.

5. The sintered product of silicon nitride according to claim 1, wherein the sintered product of silicon nitride has a relative density of 99% or more.

6. The sintered product of silicon nitride according to claim 5, wherein the sintered product of silicon nitride contains 94.5% by mass or more of silicon nitride.

7. The sintered product of silicon nitride according to claim 6, wherein a rare-earth element other than lanthanum is 0.03% by mass or less on an oxide basis.

8. The sintered product of silicon nitride according to claim 6, wherein the sintered product of silicon nitride contains 0.2% to 0.6% by mass of aluminum on an oxide basis.

9. The sintered product of silicon nitride according to claim 2, wherein any two of the needle-like silicon nitride crystal grains intersect and are in contact with each other, one of the two silicon nitride crystal grains has a depression with a depth of 50 nm or more at the side thereof, the depression has a shape corresponding to the shape of a side of the other silicon nitride crystal grain that intersects the one silicon nitride crystal grain having the depression, and the depression is in contact with said side of the other silicon nitride crystal grain.

10. The sintered product of silicon nitride according to claim 9, wherein the silicon nitride crystal grains have an average grain size of 0.5 μm or less and an average aspect ratio of 5 or less.

11. The sintered product of silicon nitride according to claim 1, wherein the magnesium content in a plane at a depth of 0.3 mm below the surface of the sintered product is 1.3% by mass or less on an oxide basis, the magnesium content in the plane at a depth of 0.3 mm below the surface of the sintered product is less than the magnesium content in a plane at a depth of 1 mm below the surface of the sintered product, and the difference in magnesium content between the plane at a depth of 0.3 mm and the plane at a depth of 1 mm below the surface of the sintered product is 0.5% by mass or less on an oxide basis.

12. The sintered product of silicon nitride according to claim 11, wherein the surface of the sintered product is an as fired surface.

13. The sintered product of silicon nitride according to claim 11, wherein the proportion of the area of the grain-boundary phase in the plane at a depth of 0.3 mm below the surface of the sintered product is 10% or less, and the proportion of the area of the grain-boundary phase in the plane at a depth of 1 mm below the surface of the sintered product is 10% or less.

14. An article of manufacture comprising a sintered product of silicon nitride according to claim 1.

15. The article of manufacture according to claim 14 that is a cutting tool.

16. A cutting method comprising:
    cutting a workpiece with the cutting tool according to claim 15.

17. A sintered product of silicon nitride, comprising:
    a crystal phase mainly including silicon nitride crystals; and
    an amorphous grain-boundary phase containing lanthanum, aluminum, magnesium, silicon, and oxygen, the amorphous grain-boundary phase being located on the grain boundaries of the silicon nitride crystals,
    wherein magnesium content in a plane at a depth of 0.3 mm below the surface of the sintered product of silicon nitride is 1.3% by mass or less on an oxide basis, the magnesium content in the plane at a depth of 0.3 mm below the surface of the sintered product is less than the magnesium content in a plane at a depth of 1 mm below the surface of the sintered product, and the difference in magnesium content between the plane at a depth of 0.3 mm and the plane at a depth of 1 mm below the surface of the sintered product is 0.5% by mass or less on an oxide basis, and wherein the total amount of lanthanum on an oxide basis, aluminum on an oxide basis, and magnesium on an oxide basis is 3.5% by mass or less.

18. A composition comprising:

a crystal phase comprising silicon nitride crystals in an amount of at least 94.5% by mass or more of silicon nitride; and an amorphous grain-boundary phase containing lanthanum, aluminum, magnesium, silicon, and oxygen, wherein the composition contains 0.1% by mass or more of lanthanum on an oxide basis, 0.05% to 0.6% by mass of aluminum on an oxide basis, 0.3% by mass or more of magnesium on an oxide basis, and 2.5% by mass or less of oxygen, and wherein the total amount of lanthanum on an oxide basis, aluminum on an oxide basis, and magnesium on an oxide basis is 3.5% by mass or less in the composition.

* * * * *